(12) United States Patent
Deleuze

(10) Patent No.: US 11,328,123 B2
(45) Date of Patent: May 10, 2022

(54) DYNAMIC TEXT CORRECTION BASED UPON A SECOND COMMUNICATION CONTAINING A CORRECTION COMMAND

(71) Applicant: International Business Machines Corporation, Armonk, NY (US)

(72) Inventor: Ivan Deleuze, Montpellier (FR)

(73) Assignee: International Business Machines Corporation, Armonk, NY (US)

( * ) Notice: Subject to any disclaimer, the term of this patent is extended or adjusted under 35 U.S.C. 154(b) by 144 days.

(21) Appl. No.: 16/353,572

(22) Filed: Mar. 14, 2019

(65) Prior Publication Data
US 2020/0293615 A1 Sep. 17, 2020

(51) Int. Cl.
*G06F 40/30* (2020.01)
*G06F 40/232* (2020.01)
*G06F 40/253* (2020.01)

(52) U.S. Cl.
CPC .......... *G06F 40/232* (2020.01); *G06F 40/253* (2020.01); *G06F 40/30* (2020.01)

(58) Field of Classification Search
CPC ...... G06F 40/166; G06F 40/20; G06F 40/232; G06F 40/253; G06F 40/274; G06F 40/30; G06F 40/35; H04M 1/72552
USPC ................................................ 704/9; 715/255
See application file for complete search history.

(56) References Cited

U.S. PATENT DOCUMENTS

| | | | | |
|---|---|---|---|---|
| 4,891,786 A * | 1/1990 | Goldwasser | .......... | G06F 3/0237 400/83 |
| 5,521,816 A * | 5/1996 | Roche | .................. | G06F 40/232 704/9 |
| 5,678,053 A * | 10/1997 | Anderson | ............. | G06F 40/253 715/256 |
| 7,305,627 B2 * | 12/2007 | Tannenbaum | ....... | G06Q 10/107 715/751 |
| 7,428,702 B1 * | 9/2008 | Cervantes | ............ | G06Q 10/107 715/255 |
| 8,700,991 B1 * | 4/2014 | Gigliotti | ............... | G06F 40/143 715/236 |
| 9,448,769 B1 * | 9/2016 | Katoch | ............... | G06F 11/3668 |
| 9,596,204 B2 * | 3/2017 | Stroila | .................. | G06F 40/295 |
| 9,965,133 B1 * | 5/2018 | Lindsey | ................ | H04L 63/101 |
| 11,082,369 B1 * | 8/2021 | Liu | .......................... | G06N 3/04 |

(Continued)

OTHER PUBLICATIONS

Mell et al., "The NIST Definition of Cloud Computing," Recommendations of the National Institute of Standards and Technology, U.S. Department of Commerce, Special Publication 800-145, Sep. 2011, 7 pgs.

*Primary Examiner* — Lamont M Spooner
(74) *Attorney, Agent, or Firm* — Peter K. Suchecki

(57) ABSTRACT

Provided is a method, system, and computer program product for dynamically correcting text of a communication sent by a user. A processor may receive a first communication sent by a first user. The processor may forward the first communication to one or more other users. The processor may receive a second communication sent by the first user. The second communication includes a command to correct an error in the first communication. The processor may determine a location of the error in the first communication. The processor may correct the error in the first communication. The processor may forward a corrected version of the first communication to the one or more other users.

20 Claims, 9 Drawing Sheets

(56) References Cited

U.S. PATENT DOCUMENTS

| | | | |
|---|---|---|---|
| 2002/0095291 A1* | 7/2002 | Sumner | G10L 15/22 704/E15.04 |
| 2002/0194278 A1* | 12/2002 | Golan | H04L 51/38 709/206 |
| 2003/0131050 A1* | 7/2003 | Vincent | H04L 51/04 709/206 |
| 2007/0074131 A1* | 3/2007 | Assadollahi | G06F 40/242 715/236 |
| 2009/0307315 A1* | 12/2009 | Murphy, Jr. | G06Q 10/107 709/206 |
| 2010/0050074 A1 | 2/2010 | Nachmani et al. | |
| 2011/0029620 A1* | 2/2011 | Bonforte | H04L 67/10 709/204 |
| 2011/0197128 A1* | 8/2011 | Assadollahi | G06F 40/274 715/259 |
| 2011/0202836 A1* | 8/2011 | Badger | G06F 3/0237 715/702 |
| 2012/0303371 A1* | 11/2012 | Labsky | G10L 15/14 704/E13.011 |
| 2013/0085743 A1* | 4/2013 | Koo | G06F 3/04886 704/9 |
| 2013/0283156 A1* | 10/2013 | Al Badrashiny | G06F 40/232 715/257 |
| 2014/0040741 A1* | 2/2014 | van Os | G06F 3/0484 715/719 |
| 2014/0104175 A1* | 4/2014 | Ouyang | G06F 40/253 345/168 |
| 2014/0317495 A1* | 10/2014 | Lau | G06F 40/232 715/257 |
| 2015/0067486 A1* | 3/2015 | Hochman | G06F 40/166 715/257 |
| 2015/0113073 A1 | 4/2015 | Chan et al. | |
| 2015/0180808 A1* | 6/2015 | Moisa | H04L 51/16 709/206 |
| 2015/0286371 A1* | 10/2015 | Degani | G06F 40/253 715/835 |
| 2016/0026962 A1 | 1/2016 | Shankar et al. | |
| 2017/0337176 A1* | 11/2017 | Cietwierkowski | H04L 51/063 |
| 2017/0346938 A1* | 11/2017 | Allen | H04L 51/063 |
| 2018/0039608 A1* | 2/2018 | Sharifi | G06F 40/232 |
| 2018/0089310 A1 | 3/2018 | Barsness et al. | |
| 2019/0103097 A1* | 4/2019 | Li | G10L 15/22 |
| 2019/0205372 A1* | 7/2019 | Li | G06N 20/00 |
| 2019/0370323 A1* | 12/2019 | Davidson | G06F 40/253 |
| 2019/0379622 A1* | 12/2019 | Iyer | H04L 65/1006 |
| 2020/0210053 A1* | 7/2020 | Baunach | G06Q 10/101 |
| 2020/0410167 A1* | 12/2020 | Chen | G06N 3/08 |

* cited by examiner

401A

| First User (Sender) | |
|---|---|
| SM1 | I bought shoes today |
| SM2 | +black |

402A

| Second User (Recipient) | |
|---|---|
| RM2 | I bought black shoes today |

| First User (Sender) | |
|---|---|
| SM1 | I bought shoes today |
| SM2 | +black |

402B

| Second User (Recipient) | |
|---|---|
| RM1 | I bought shoes today (read) |
| N | The original text contains an error |
| RM2 | I bought [black] shoes today |

| First User (Sender) | |
|---|---|
| SM1 | I bought white shoes today. |
| SM2 | -white +black |

602A

| Second User (Recipient) | |
|---|---|
| RM2 | I bought black shoes today. |

| First User (Sender) | |
|---|---|
| SM1 | I bought white shoes today. |
| SM2 | -white +black |

602B

| Second User (Recipient) | |
|---|---|
| RM1 | I bought white shoes today. (read) |
| RM2 | I bought black shoes today |

DYNAMIC TEXT CORRECTION BASED UPON A SECOND COMMUNICATION CONTAINING A CORRECTION COMMAND

BACKGROUND

The present disclosure relates generally to the field of electronic communications, and more specifically, to correcting errors in sent messages.

Electronic communication devices are utilized by many users to send electronic messages to one another. For example, a user may send a text message to one or more other users by using a smartphone. In some instances, the user may send a message containing an error and instantly recognize the error after the message has been sent.

SUMMARY

Embodiments of the present disclosure include a method and system for correcting errors in sent messages. A processor may receive a first communication sent by a first user. The processor may forward the first communication to one or more other users. The processor may receive a second communication sent by the first user. The second communication includes a command to correct an error in the first communication. The processor may determine a location of the error in the first communication. The processor may correct the error in the first communication. The processor may forward a corrected version of the first communication to the one or more other users.

Additional embodiments of the present disclosure include a computer program product for correcting errors in sent messages. Computer program product instruction may cause a processor to receive a first communication sent by a first user. The processor may detect a command to correct an error in the first communication has been typed by a user in a user interface. The processor may delay forwarding of the first communication containing the error to one or more other users. The processor may receive a second communication sent by the first user, wherein the second communication includes the command to correct the error in the first communication. The processor may terminate, in response to receiving the second communication containing the command to correct the error in the first communication, the forwarding of the first communication containing the error. The processor may determine a location of the error in the first communication. The processor may correct the error in the first communication and forward a corrected version of the first communication to the one or more other users.

The above summary is not intended to describe each illustrated embodiment or every implementation of the present disclosure.

BRIEF DESCRIPTION OF THE DRAWINGS

The drawings included in the present disclosure are incorporated into, and form part of, the specification. They illustrate embodiments of the present disclosure and, along with the description, serve to explain the principles of the disclosure. The drawings are only illustrative of typical embodiments and do not limit the disclosure.

FIG. 4A illustrates an example diagram for inserting a missing word into an unread message, in accordance with embodiments of the present disclosure.

FIG. 4B illustrates an example diagram for highlighting a corrected word in a new message, in accordance with embodiments of the present disclosure.

FIG. 6A illustrates an example diagram for substituting a word in an unread message, in accordance with embodiments of the present disclosure.

FIG. 6B illustrates an example diagram for highlighting a substituted word in a new message, in accordance with embodiments of the present disclosure.

Figure 1:
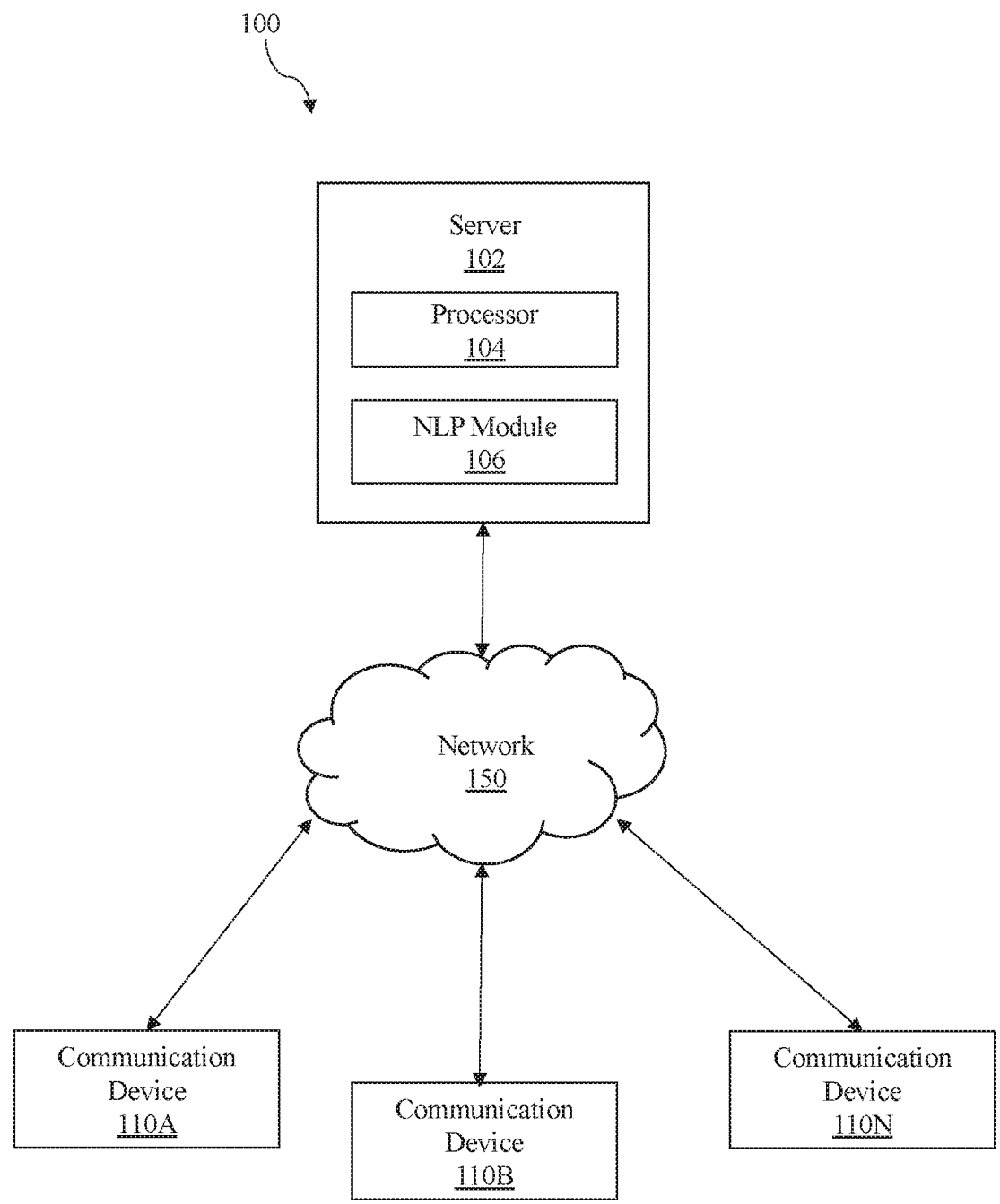
FIG. 1 illustrates a block diagram of a dynamic text correction system, in accordance with embodiments of the present disclosure.

While the embodiments described herein are amenable to various modifications and alternative forms, specifics thereof have been shown by way of example in the drawings and will be described in detail. It should be understood, however, that the particular embodiments described are not to be taken in a limiting sense. On the contrary, the intention is to cover all modifications, equivalents, and alternatives falling within the spirit and scope of the disclosure.

DETAILED DESCRIPTION

Aspects of the present disclosure relate to the field of electronic communications, and more particularly to correcting errors in sent messages. While the present disclosure is not necessarily limited to such applications, various aspects of the disclosure may be appreciated through a discussion of various examples using this context.

Electronic communication devices (e.g., smartphones, tablets, computers, etc.) are utilized by many users to send messages (e.g., text messages, email, etc.) to one another. For example, a user may send a text message to one or more other users by using a smartphone. In some instances, the user may send a text message containing an error and instantly recognize the error after the message has been sent. To correct the message, the user may send an updated version of the text message with the corrected text. In another example, the user may have typed a wrong word or misspelled a word. Typically, in such an instance the user may send a second text message pointing out the error so that the recipient is notified of the mistake. Correcting or pointing out the error in a previous text message may take time and disrupt the flow of a text message conversation.

Embodiments of the present disclosure allow a user to correct an error in a previously sent communication (e.g., text message) by utilizing various edit commands. In an embodiment, the user may type an edit command in a user interface to correct an error in a first communication that was sent to one or more other users. Once the command to fix the error is entered, the system will determine a location of the error in the first communication and correct the error. Once the error is corrected, the system may forward a corrected version of the first communication to the one or more other users.

For example, a user may send a first text message to a recipient containing an error, such as a missing word. For example, the user may send a text message stating, "I bought a new pair of." After sending the text message, the user may notice the text message is missing the word "gloves." To correct the message, the user may type a "+" adjacent to the word "gloves" (e.g., "+gloves"), and send this edit command to the system in order to add the word to the previously sent text message. The text message including the edit command will not be received by the recipient and will only be received by the server of the system. Once the system receives the command, the system will determine where to place the word "gloves" in the first text message containing the error by utilizing machine learning (e.g., natural language processing). A corrected version of the text message containing the word "gloves" in the proper location (e.g., "I bought a new pair of gloves.") will be sent to the recipient.

In embodiments, the system may allow a user to add, delete, replace, or correct misspelled words within a sent communication by using various commands. For example, the user may recognize that the word glove is misspelled as "gkove" in a sent text message. To correct the misspelled word, the user may type the edit commands "–k" and "+l" in a second text message. The system will receive the command and determine that the incorrect word "gkove" needs to be corrected by removing the "k" and adding the "l" to get glove. Once the misspelled word is fixed, a corrected message with the properly spelled word will be sent to the one or more recipients of the message.

In an embodiment, once the original message is rectified, the corrected version of the message may replace an unread version of the message containing the error on a recipient's user interface. For example, the system may determine that the recipient of a text message containing an error has not yet read the text message. In this instance, the system will replace the text message containing the error with a corrected version of the message without notifying the recipient of the error. In this way, the recipient will only see the corrected version of the text message and the conversion between the sender and recipient will flow without any disruption as a result of the error (e.g., the sender does not need to explain the error).

In an embodiment, if the recipient has read the text message containing the error, the corrected version of the message may be sent additionally as a second message with the correction highlighted or otherwise marked as corrected (e.g., underlined, struck through, in a different font type or color). By highlighting the correction, the recipient is notified where the correction has taken place within the text message without any further explanation by the sender. In this way, the sender does not have to indicate where the error is, and the textual conversation can continue as normal. In some embodiments, the system may send an additional message indicating that the previous message contained an error.

The aforementioned advantages are example advantages, and not all advantages are discussed. Furthermore, embodiments of the present disclosure can exist that contain all, some, or none of the aforementioned advantages while remaining within the spirit and scope of the present disclosure.

With reference now to FIG. 1, shown is a block diagram of a dynamic text correction system 100, in accordance with embodiments of the present disclosure. In the illustrated embodiment, the dynamic text correction system 100 includes a server 102 and communication device 110A, 110B, and 110N (collectively referred to communication devices 110) that are communicatively coupled via a network 150. The network 150 may be any type of communication network, such as a telecommunications network or a cloud computing network.

Figure 8:
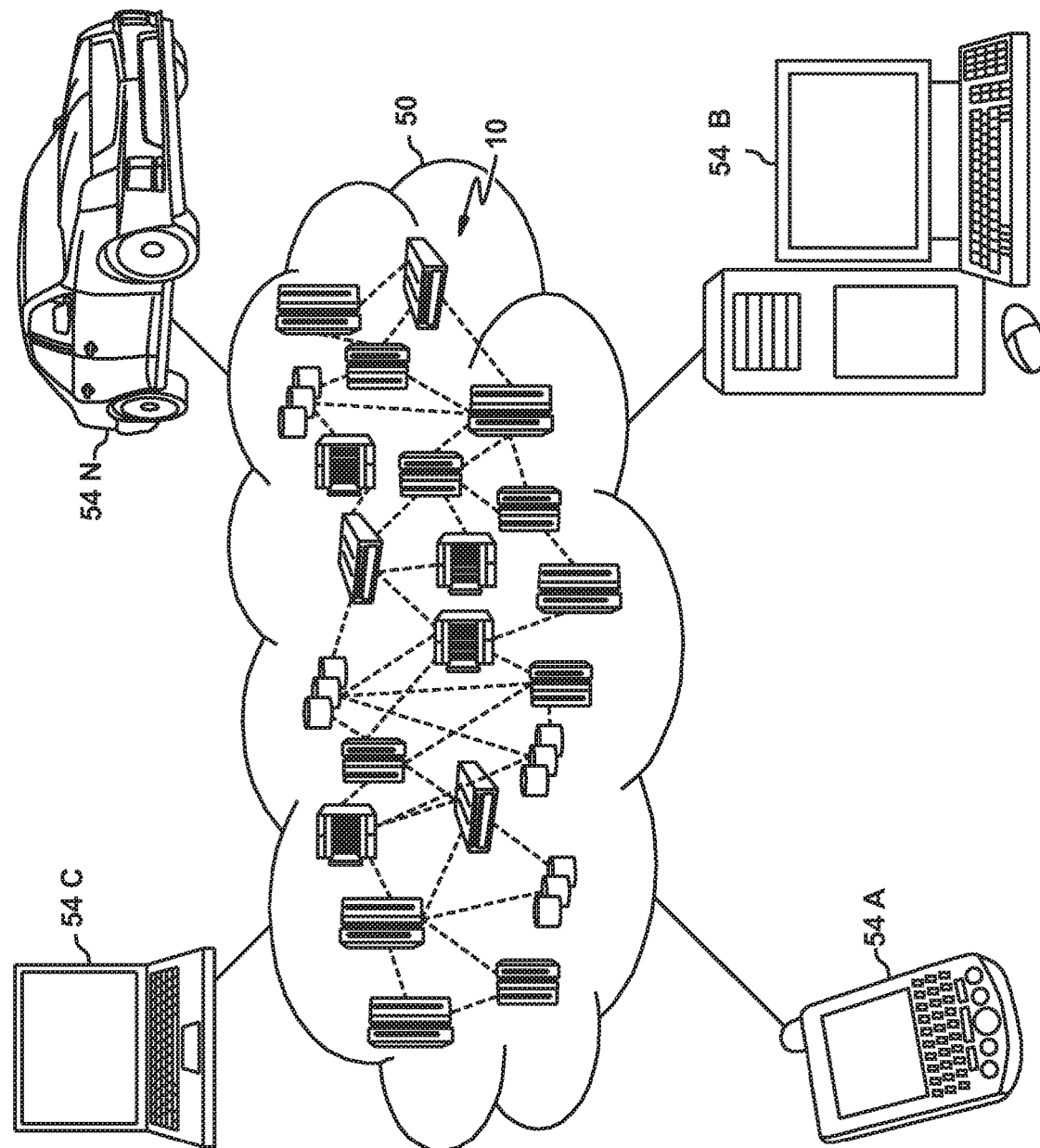
FIG. 8 depicts a cloud computing environment according to an embodiment of the present invention.
Figure 9:
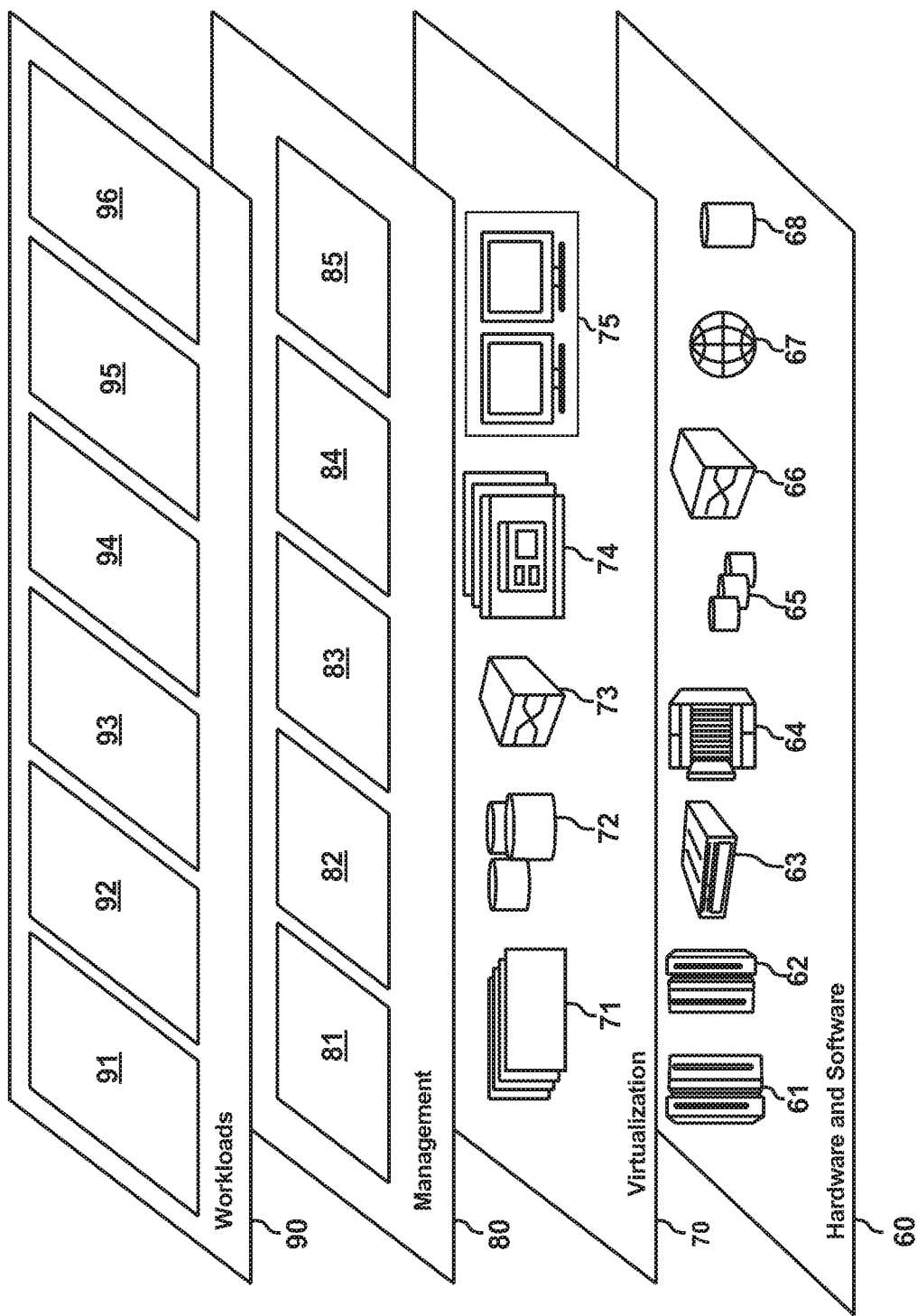
FIG. 9 depicts abstraction model layers according to an embodiment of the present invention.

The network 150 may be substantially similar to, or the same as, network 50 described in FIG. 8 and FIG. 9. In some embodiments, the network can be implemented using any number of any suitable communications media. For example, the network may be a wide area network (WAN), a local area network (LAN), an internet, or an intranet. In certain embodiments, the various systems may be local to each other, and communicate via any appropriate local communication medium. For example, the server 102 may communicate with the communication devices 110 using a WAN, one or more hardwire connections (e.g., an Ethernet cable) and/or wireless communication networks (e.g., wireless router, telecommunication network, etc.). In some embodiments, the various systems may be communicatively coupled using a combination of one or more networks and/or one or more local connections. For example, the server 102 may communicate with communication device 110A using a hardwired connection, while communication between the server 102 and communication device 110N may be through a wireless communication network (e.g., telecommunications network).

Figure 7:
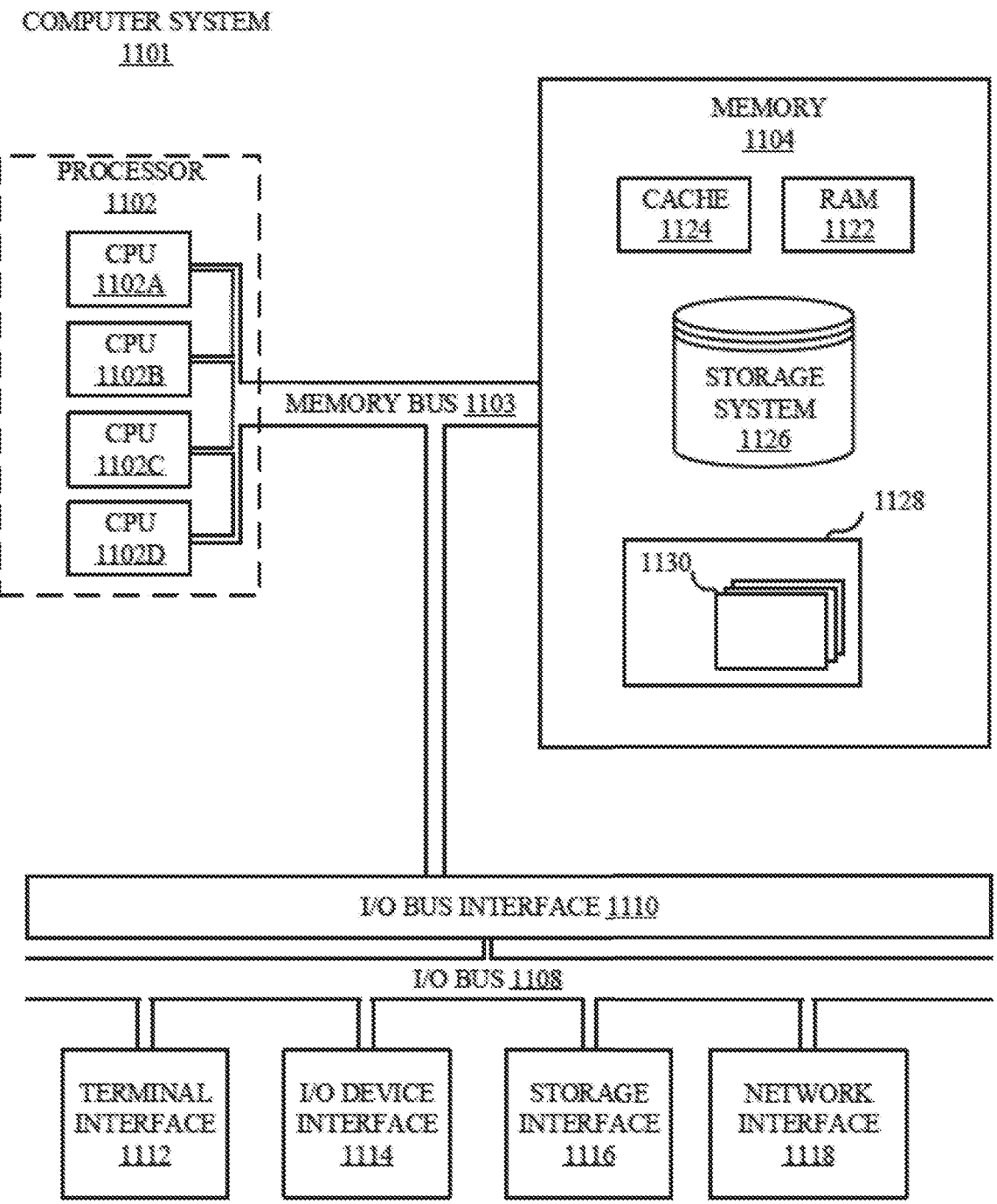
FIG. 7 illustrates a high-level block diagram of an example computer system that may be used in implementing one or more of the methods, tools, and modules, and any related functions, described herein, in accordance with embodiments of the present disclosure.

The server 102 may be any type of computer system and may be substantially similar to computer system 1101 of FIG. 7. The server 102 may be any type of device (e.g., cellular tower, call center, etc.) configured to store, send, and receive electronic communications (e.g., text message, email, etc.) to and/or from the communication devices 110. For example, the server 102 may be a cellular tower that receives text messages from communication device 110A and forwards the received text messages to communication device 110B over a control channel.

In the illustrated embodiment, server 102 includes a processor 104 and a natural language processing (NLP) module 106. The NLP module 106 may analyze communications sent and/or received from one or more users to determine errors within the communication. For example, if a user indicates there is an error in a text message (e.g., by initiating an edit command such as "+" or "–" adjacent to a word or letter) the NLP module 106 will determine the location of the error and make the respective correction. The NLP module 106 may analyze the text message for context, semantics, grammar, and spelling to determine the appropriate corrective action for the text. In some embodiments, the NLP module 106 may only perform natural language processing on messages that include an edit command. For example, the NLP module 106 (or the processor 104) may scan received messages for an edit command, and responsive to detecting an edit command in a message, the NLP module 106 may parse and analyze the message as described herein. Messages that do not include an edit command may not, in these embodiments, be read and/or analyzed by the NLP module 106.

For example, if the system receives a command to add a missing word to a sentence in a text message, the NLP module 106 will determine the proper location of the word. In other embodiments, the system 100 may include other machine learning modules (e.g., artificial neural networks) to learn from various commands provided by the user. For example, the system may include other machine learning modules that analyze historical commands entered by the user for correcting various sentence structures and/or words and may automatically update the communication prior to forwarding the communication to a recipient.

The communication devices 110 may be any type of device (e.g., smartphone, tablet, smart tv, computer, and the like) configured to send and/or receive electronic communications (e.g., text message, email, etc.). The communication device 110 may be any type of computer system and may be substantially similar to computer system 1101 of FIG. 7. Each of the communication devices 110 includes a user interface allowing a user to type and read messages sent to and from other users. For example, communication device 110A may be a smartphone having a texting interface where the user may type and send texts messages to communication device 110B. Communication device 110B may be a tablet having a similar texting interface where a user can type, send, and receive text messages from communication device 110A.

It is noted that FIG. 1 is intended to depict the representative major components of the dynamic text correction system 100. In some embodiments, however, individual components may have greater or lesser complexity than as represented in FIG. 1, components other than or in addition to those shown in FIG. 1 may be present, and the number, type, and configuration of such components may vary. Likewise, one or more components shown with the system 100 may not be present, and the arrangement of components may vary.

For example, while FIG. 1 illustrates an example dynamic text correction system 100 having a single server 102, three communication devices 110 and one network 150, suitable network architectures for implementing embodiments of this disclosure may include any number of servers, communication devices, and networks. The various models, modules, systems, and components illustrated in FIG. 1 may exist, if at all, across a plurality of media playback devices, cognitive state determination devices, and databases.

Figure 2:
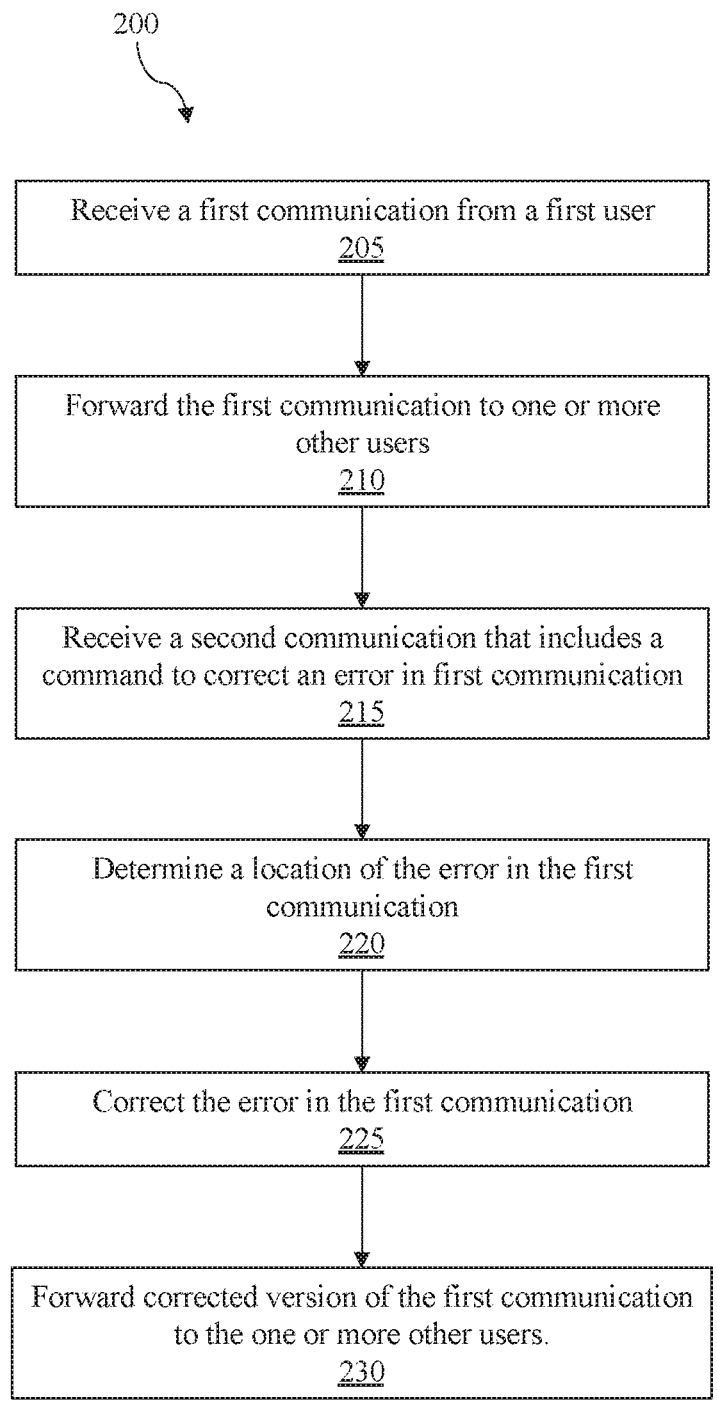
FIG. 2 illustrates a flow diagram of an example process for correcting a sent message, in accordance with embodiments of the present disclosure.

Referring now to FIG. 2, shown is a flow diagram of an example process 200 for correcting a sent message, in accordance with embodiments of the present disclosure. The process 200 may be performed by processing logic that comprises hardware (e.g., circuitry, dedicated logic, programmable logic, microcode, etc.), software (e.g., instructions run on a processor to perform hardware simulation), firmware, or a combination thereof. In some embodiments, the process 200 is a computer-implemented process. The process 200 may be performed by processor 104 exemplified in FIG. 1.

The process 200 begins by receiving a first communication sent by a first user. This is illustrated at step 205. For example, the first user may send a first communication (e.g., text message) from a smartphone intended for one or more recipients. In embodiments, the text message is received at a server (e.g., cellular tower). The first communication is assumed to contain an error (e.g., misspelled word, missing word, repeated word, etc.).

The process 200 continues by forwarding the first communication to one or more other users. This is illustrated by step 210. For example, once the server receives a text message from the first user, the server forwards the message to the intended recipient(s). In embodiments, the first communication may be forwarded to multiple users (e.g., a group text message) or a single user only.

The process 200 continues by receiving a second communication sent by the first user, wherein the second communication includes a command to correct an error in the first communication. This is illustrated at step 215. For example, the first user may immediately realize that the previously sent text message contains an error (e.g., spelling error, missing word, incorrect word, etc.). To correct the error, the first user types an edit command (e.g., typing a "+" or "−" adjacent to a word) into a user interface within a second message to indicate to the processor that the first communication contains an error. For example, if the user realizes a first message stating, "I like shoes" is missing the word "black" the user may type the command "+black" into a second message to indicate to the processor to add the word black to the first sent message (e.g., "I like black shoes."). It is contemplated that any message containing an edit command will only be received by the server and not forwarded to the recipient. Correcting the first communication is further detailed in FIGS. 4A through 6B.

The process 200 continues by determining a location of the error in the first communication. This is illustrated at step 220. The processor may use machine learning (e.g., NLP module 106 as exemplified in FIG. 1) to determine the location of the error in the first communication by correlating the first message with the edit command in the second message. For example, the processor may analyze the sentence "I like shoes" and determine the only grammatical and/or logical place to add the word black to the sentence is between "like" and "shoes."

In an embodiment, if the processor determines there are two or more proper locations for adding or deleting a word, the server may request the first user to select a change command for adding or removing the word in the appropriate location (e.g., the server my use a pop-up window in a messaging app to show both potential changes). For example, if a user wants to add the word "black" (e.g., +black typed in a second message) to a previously sent message stating, "I bought a pair of shoes and two shirts" the processor may be unable to determine where to properly place the word "black" in the sent message (e.g., unable to determine if the word "black" should be placed before the word "shoes" or the word "shirts"). In such an instance, the processor would notify the user to choose the proper location via a request. In another embodiment, if the processor is unable to determine the proper location, the second message may be sent as "+black" to the recipient without updating the first message. In this way, the recipient is still notified of the error.

The process 200 continues by correcting the error in the first communication. This is illustrated at step 225. Once the proper location for the missing word is determined, the processor will insert the missing word into the sentence from the first communication. For example, returning to the "I like shoes" example, the processor will insert the word to produce the corrected version of the sentence as "I like black shoes." Once the first communication is corrected, the process 200 continues by forwarding a corrected version of the first communication to the one or more other users. This is illustrated at step 230.

In an embodiment, the forwarding of the first communication (step 210) may be delayed if the processor detects that the user has started typing an edit command. For example, if the user has immediately recognized there was an error included in a sent text message and begins typing a "+" command, the processor (e.g., assuming the first text message has not yet been forwarded to one or more recipients) may delay forwarding the text message containing the error. If the user completes the command to correct the first text message, then the processor may terminate the forwarding of the original text message containing the error (e.g., step 210). In this way, the one or more recipients will never receive the first message containing the error. Such a circumstance may occur if a recipient's communication device was not able to receive messages (e.g., the recipient had no service) during a certain time frame.

Figure 3:
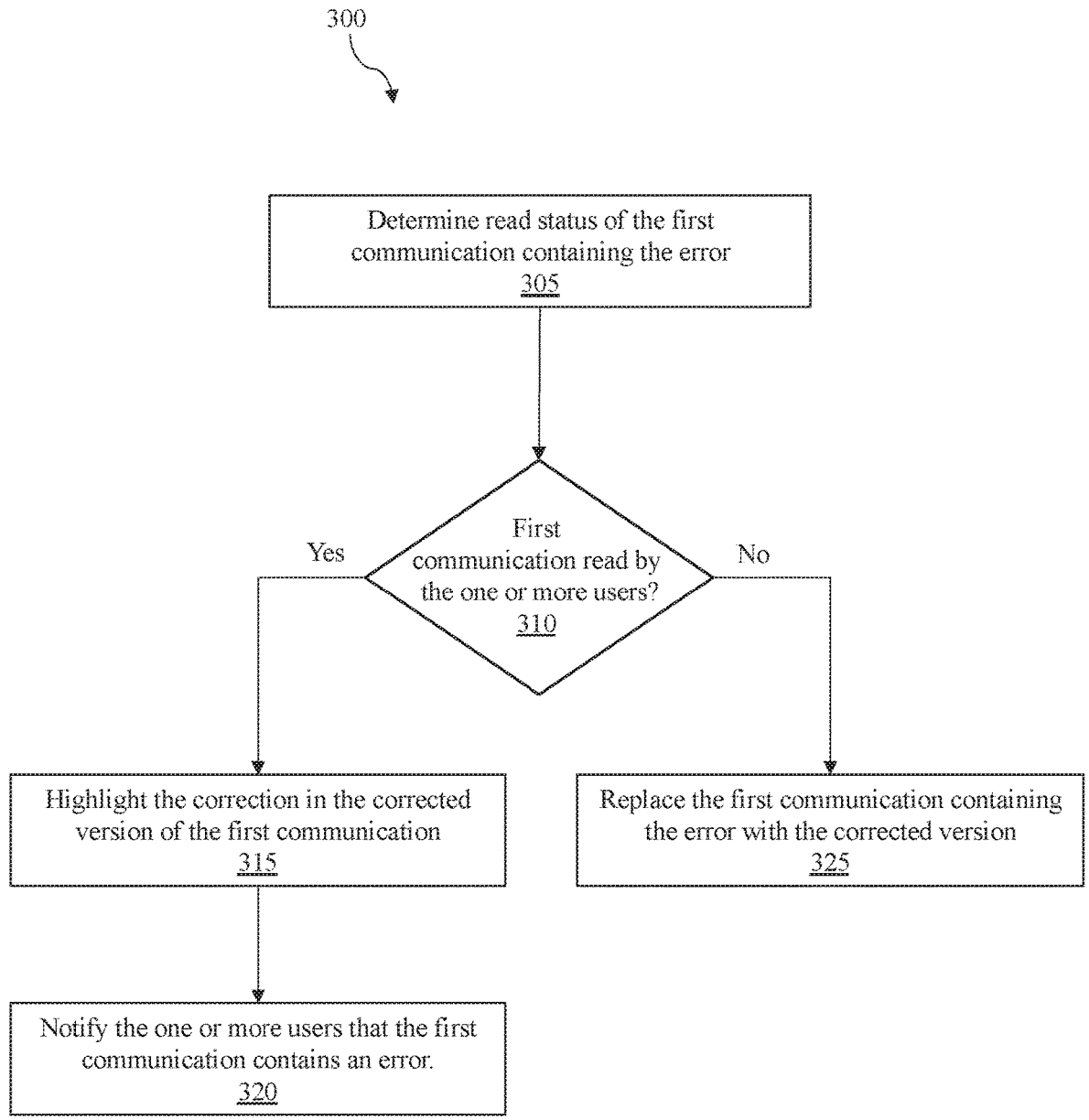
FIG. 3 illustrates a flow diagram of an example process for sending a corrected version of a message based on read status, in accordance with embodiments of the present disclosure.

Referring now to FIG. 3, shown is a flow diagram of an example process 300 for sending a corrected version of a message based on read status, in accordance with embodiments of the present disclosure. Process 300 may be in addition to or a subset of process 200. The process 300 may be performed by processing logic that comprises hardware (e.g., circuitry, dedicated logic, programmable logic, microcode, etc.), software (e.g., instructions run on a processor to perform hardware simulation), firmware, or a combination thereof. In some embodiments, the process 300 is a computer-implemented process. The process 300 may be performed by processor 104 exemplified in FIG. 1.

The process 300 begins by determining the read status of the first communication containing the error for each of the one or more other users. This is illustrated at step 305. For example, the processor may determine if each recipient of a text message containing an error has read the text message.

If the first communication has not been read by the one or more other users, "No" at step 310, the process 300 continues by replacing the first communication containing the error with the corrected version of the first communication. This is illustrated at step 325. For example, the text message "I like shoes" that is missing the word "black" will be replaced on recipient's user interface with a corrected message "I like black shoes" if the recipient has not read the first text message. In this way, the recipient of the text message never sees the incorrect message.

If the first communication containing the error has been read by the one or more other users, "Yes" at 310, the process 300 continues by highlighting the correction in a sent corrected version of the first communication. This is illustrated at 315. For example, the processor may determine the first text message containing the error was read by the recipient. Because the recipient read the text message, the processor will forward the corrected version of the text message in addition to the original text message to the recipient's interface. The corrected message may include a highlighted portion to indicate where the correction was made. For example, the corrected version of "I like black shoes" will be shown on the recipient's user interface with the word "black" highlighted. In some embodiments, the correction may not be highlighted.

In some embodiments, the process 300 continues by notifying the one or more other users that the first communication contains an error. This is illustrated at step 320. For example, the system my send an additional message stating the reason why the second message was forwarded to the recipient. For example, the notification may state, "the original text message contains an error." In other embodiments, the message may include the description of the error depending on the chosen edit command. For example, the notification may state, "the original text message was missing the word 'black'."

Referring now to FIG. 4A, shown is an example diagram for inserting a missing word into an unread message, in accordance with embodiments of the present disclosure. In the illustrated embodiment, a first user interface 401A is shown for the sender of the text messages and a second user interface 402A is shown for the recipient. A first user (e.g., sender) types a first message SM1 as "I bought shoes today" in the first user interface 401A and sends the message to a second user interface 402A. The first user notices there is a missing word in the first message SM1 and wants to include the word "black" in the message. To correct the first message SM1, the first user types a special character to initiate an edit command to fix the first message SM1. In the illustrated embodiment, the special character is a "+" sign placed adjacent to the word "black" to indicate to the system that the word "black" should be added to the message SM1. Once the edit command is sent in a second message SM2 on the first user interface 401A, the system will determine the proper location of the additional word black and update the first message SM1. If the second user (e.g., recipient) has not read the first message, the system will replace the first message with the corrected version of the message. For example, the second user only sees the corrected version of the message RM2 "I bought black shoes today" on the second user interface 402A.

In embodiments, it is contemplated that one or more words may be added to the message. For example, the first user may type "+at the mall" and the processor will determine that the phrase should be added at the end of the sentence of message SM1 (e.g., "I bought shoes today at the mall"). In some embodiments additional characters may be used to add, remove, and/or modify the message.

Referring now to FIG. 4B, shown is an example diagram for highlighting a corrected word in a read message, in accordance with embodiments of the present disclosure. In the illustrated embodiment, the first user interface 401B includes the same text messages as 401A in FIG. 4A. However, the system has determined that the second user has read the first message RM1 on the second user interface 402B. For example, the second user reads the first message RM1 as "I bought shoes today." In this instance, when the first user corrects the first message SM1 on the first user interface 401B to include the word "black", the second user receives a notification N on the second user interface 402B from the system that the original message RM1 contains an error. The second user then receives the corrected version of the message RM2 on the second user interface 402B. In some embodiments, the correction may be highlighted to show the second user where the error was in the original message. For example, in message RM2 the word "black" is highlighted on the second user interface 402B to indicate that the word was added to the original message. In other embodiments, the correction may not be highlighted.

Figure 5A:
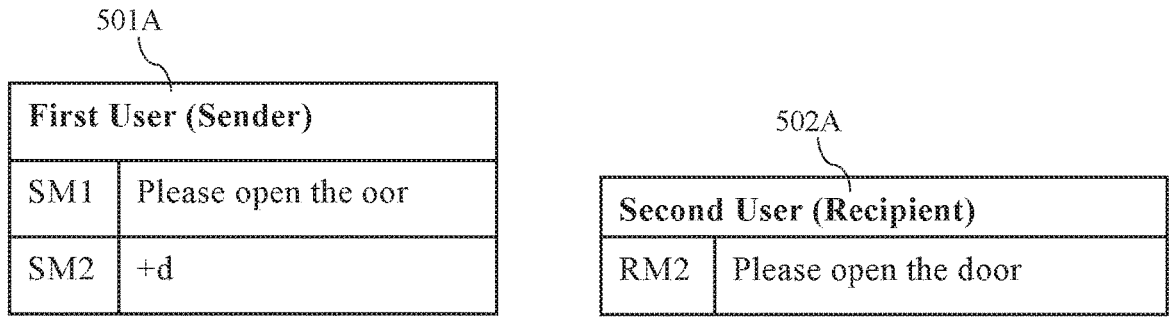
FIG. 5A illustrates an example diagram for inserting a missing letter into a word in an unread message, in accordance with embodiments of the present disclosure.

Referring now to FIG. 5A, shown is an example diagram for inserting a missing letter into a word in an unread message, in accordance with embodiments of the present disclosure. In the illustrated embodiment, a first user interface 501A is shown for the sender of the text messages and a second user interface 502A is shown for the recipient. A first user (e.g., sender) types a first message SM1 as "Please open the oor" and sends the message to a second user interface 502A. The first user notices there is a missing letter in the word door in the first message SM1 and wants to include the letter "d" to correct the word "oor" in the message. To correct the message SM1, the first user types "+" adjacent to the letter "d" to initiate an edit command to indicate to the processor that the letter "d" should be added to the message SM1. Once the command is sent in message SM2 on the first user interface 501A, the system will determine where the missing letter should be placed within the message SM1 and insert the letter accordingly. If the second user (e.g., recipient) has not read the first message on the second user interface 502A, the system will replace the first message with the corrected version of the message RM2. For example, the second user only sees the corrected version of the message RM2 as "Please open the door" on the second user interface 502A.

Figure 5B:
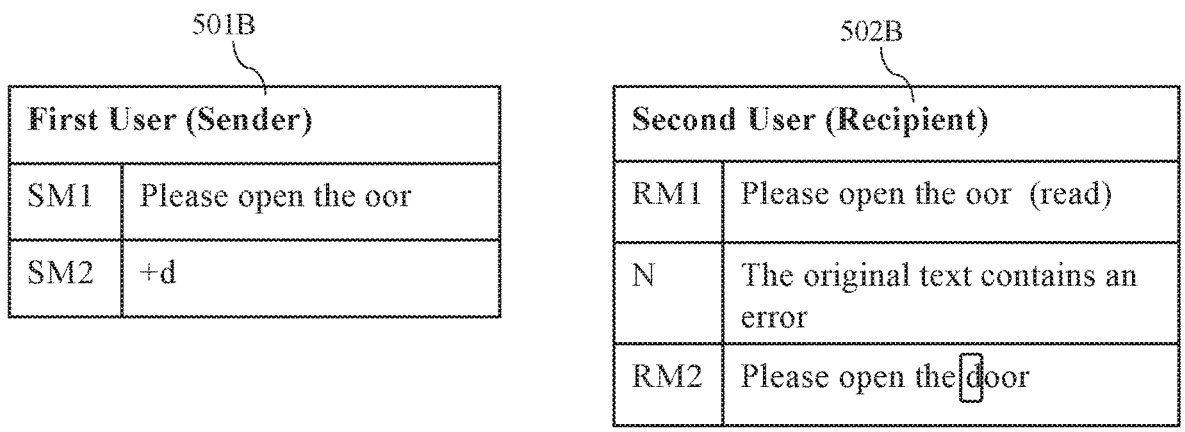
FIG. 5B illustrates an example diagram for highlighting a corrected letter in a word in a new message, in accordance with embodiments of the present disclosure.

Referring now to FIG. 5B, shown is an example diagram for highlighting a corrected letter in a word in a new message, in accordance with embodiments of the present disclosure. In the illustrated embodiment, the first user interface 501B includes the same messages as 501A in FIG. 5A. However, the second user has read the first message RM1 on the second user interface 502B. For example, the second user reads the first message RM1 as "Please open the oor." When the first user corrects the first message SM1 to include the letter "d", the second user receives a notification N from the system on the second user interface 502B that the original message RM1 contains an error. The second user then receives a corrected version of the message RM2 on the second user interface 402B. In some embodiments, the correction may be highlighted to show the second user where the error was in the original message. For example, the "d" in door may be highlighted in the corrected message RM2 on the second user interface 502B.

Referring now to FIG. 6A, shown is an example diagram for substituting a word in an unread message, in accordance with embodiments of the present disclosure. In the illustrated embodiment, a first user interface 601A is shown for the sender of the text messages and a second user interface 602A is shown for the recipient. A first user types a first message SM1 as "I bought white shoes today" and sends the message SM1 to the second user interface 602A. The first user notices they typed an incorrect word in the first message SM1 and wants to substitute the word "black" for the word "white" in the first message SM1. To correct the message SM1, the first user types "–white" and "+black" into the first user interface 601A to initiate edit commands to fix the incorrect message. Once the commands are sent in the second message SM2, the system will determine where to make the substitution. If the second user has not read the first message on the second user interface 602A, the system will replace the first message with the corrected version of the message RM2. For example, the second user only sees the corrected version of the message RM2 "I bought black shoes today."

Referring now to FIG. 6B, shown is an example diagram for highlighting a substituted word in a new message, in accordance with embodiments of the present disclosure. In the illustrated embodiment, the first user interface 601B includes the same messages as 601A in FIG. 6A. However, the second user has read the first message RM1 on the second user interface 602B. For example, the second user reads the first message RM1 as "I bought white shoes today." When the first user corrects the first message SM1 to substitute the word "black" for the word "white", the second user then receives a corrected version of the message RM2 on the second user interface 402B. In this example, the system does not include a notification indicating there was an error with the original message and only highlights the word black to show where the correction was made on the second user interface 602B.

Referring now to FIG. 7, shown is a high-level block diagram of an example computer system 1101 that may be used in implementing one or more of the methods, tools, and modules, and any related functions, described herein (e.g., using one or more processor circuits or computer processors of the computer), in accordance with embodiments of the present disclosure. In some embodiments, the major components of the computer system 1101 may comprise one or more CPUs 1102, a memory subsystem 1104, a terminal interface 1112, a storage interface 1116, an I/O (Input/Output) device interface 1114, and a network interface 1118, all of which may be communicatively coupled, directly or indirectly, for inter-component communication via a memory bus 1103, an I/O bus 1108, and an I/O bus interface unit 1110.

The computer system 1101 may contain one or more general-purpose programmable central processing units (CPUs) 1102A, 1102B, 1102C, and 1102D, herein generically referred to as the CPU 1102. In some embodiments, the computer system 1101 may contain multiple processors typical of a relatively large system; however, in other embodiments the computer system 1101 may alternatively be a single CPU system. Each CPU 1102 may execute instructions stored in the memory subsystem 1104 and may include one or more levels of on-board cache. In some embodiments, a processor can include at least one or more of, a memory controller, and/or storage controller. In some embodiments, the CPU can execute the processes included herein (e.g., process 200 (FIG. 2) and 300 (FIG. 3)).

System memory 1104 may include computer system readable media in the form of volatile memory, such as random access memory (RAM) 1122 or cache memory 1124. Computer system 1101 may further include other removable/non-removable, volatile/non-volatile computer system data storage media. By way of example only, storage system 1126 can be provided for reading from and writing to a non-removable, non-volatile magnetic media, such as a "hard drive." Although not shown, a magnetic disk drive for reading from and writing to a removable, non-volatile magnetic disk (e.g., a "floppy disk"), or an optical disk drive for reading from or writing to a removable, non-volatile optical disc such as a CD-ROM, DVD-ROM or other optical media can be provided. In addition, memory 1104 can include flash memory, e.g., a flash memory stick drive or a flash drive. Memory devices can be connected to memory bus 1103 by one or more data media interfaces. The memory 1104 may include at least one program product having a set (e.g., at least one) of program modules that are configured to carry out the functions of various embodiments.

Although the memory bus 1103 is shown in FIG. 7 as a single bus structure providing a direct communication path among the CPUs 1102, the memory subsystem 1104, and the I/O bus interface 1110, the memory bus 1103 may, in some embodiments, include multiple different buses or communication paths, which may be arranged in any of various forms, such as point-to-point links in hierarchical, star or web configurations, multiple hierarchical buses, parallel and redundant paths, or any other appropriate type of configuration. Furthermore, while the I/O bus interface 1110 and the I/O bus 1108 are shown as single units, the computer system 1101 may, in some embodiments, contain multiple I/O bus interface units 1110, multiple I/O buses 1108, or both. Further, while multiple I/O interface units are shown, which separate the I/O bus 1108 from various communications paths running to the various I/O devices, in other embodiments some or all of the I/O devices may be connected directly to one or more system I/O buses.

In some embodiments, the computer system 1101 may be a multi-user mainframe computer system, a single-user system, or a server computer or similar device that has little or no direct user interface, but receives requests from other computer systems (clients). Further, in some embodiments, the computer system 1101 may be implemented as a desktop computer, portable computer, laptop or notebook computer, tablet computer, pocket computer, telephone, smart phone, network switches or routers, or any other appropriate type of electronic device.

It is noted that FIG. 7 is intended to depict the representative major components of an exemplary computer system 1101. In some embodiments, however, individual components may have greater or lesser complexity than as represented in FIG. 7, components other than or in addition to those shown in FIG. 7 may be present, and the number, type, and configuration of such components may vary.

One or more programs/utilities 1128, each having at least one set of program modules 1130 may be stored in memory 1104. The programs/utilities 1128 may include a hypervisor (also referred to as a virtual machine monitor), one or more operating systems, one or more application programs, other program modules, and program data. Each of the operating systems, one or more application programs, other program modules, and program data or some combination thereof, may include an implementation of a networking environment. Programs 1128 and/or program modules 1130 generally perform the functions or methodologies of various embodiments.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 8, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 8 are intended to be illustrative only and that computing nodes 10 and cloud computing environment 50 can communicate with any type of computerized device over any type of network and/or network addressable connection (e.g., using a web browser).

Referring now to FIG. 9, a set of functional abstraction layers provided by cloud computing environment 50 (FIG. 8) is shown. It should be understood in advance that the components, layers, and functions shown in FIG. 9 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and mobile desktops 96.

As discussed in more detail herein, it is contemplated that some or all of the operations of some of the embodiments of methods described herein may be performed in alternative orders or may not be performed at all; furthermore, multiple operations may occur at the same time or as an internal part of a larger process.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method comprising:
    receiving, by a processor, a first communication sent from a first communication device by a first user;
    forwarding, by the processor, the first communication to one or more other communication devices associated with one or more other users;
    receiving, by the processor, a second communication sent from the first communication device by the first user, wherein the second communication includes an edit command character configured to correct an error in the first communication, wherein the error is a missing word located between two adjacent sequential words in the first communication;
    determining, by the processor and based on the edit command character, two or more locations that have a potential error in the first communication, wherein each of the two or more locations that have the potential error would be grammatically correct without inserting the missing word and when inserting the missing word;
    prompting, by the processor, the first user to select at least one of the two or more locations that have the potential error to correct;
    correcting, by the processor and in response to the first user selecting the at least one location to correct, the error by inserting the missing word between the two adjacent sequential words at the selected at least one location in the first communication; and
    forwarding, by the processor, a corrected version of the first communication to the one or more other communication devices.

2. The method of claim 1, further comprising:
    determining, by the processor, the first communication containing the error has not been read by the one or more other users; and
    replacing, by the processor, the first communication containing the error with the corrected version of the first communication.

3. The method of claim 1, further comprising:
    determining, by the processor, the first communication containing the error has been read by the one or more other users; and
    highlighting, by the processor, a correction in the corrected version of the first communication prior to forwarding the corrected version of the first communication to the one or more other users.

4. The method of claim 3, further comprising:
    notifying, by the processor, the one or more other users that the first communication contains the error.

5. The method of claim 1, wherein determining the two or more locations that have the potential error in the first communication is performed by natural language processing.

6. The method of claim 1, wherein the edit command character is configured to add one or more words to the first communication.

7. The method of claim 6, wherein the edit command character is a plus character placed adjacent to the one or more words.

8. The method of claim 7, further comprising:
    generating, by the processor, the corrected version of the first communication by placing the one or more words adjacent to the plus character in the at least one location of the first communication.

9. The method of claim 1, wherein the second communication containing the edit command character is not forwarded to the one or more other communication devices.

10. The method of claim 1, wherein the missing word was not present in the first communication.

11. The method of claim 10, wherein the missing word does not include a misspelled word.

12. The method of claim 1, further comprising:
    detecting, by the processor, the edit command to insert the missing word has been typed in a user interface; and
    analyzing, by the processor and using natural language processing, the first communication for context, grammar, and semantics to identify the two or more locations that have the potential error in the first communication.

13. The method of claim 1, wherein correcting the error by inserting the missing word between the two adjacent sequential words at the selected at least one location in the first communication is performed automatically using machine learning by analyzing historical edit commands entered by the user for correcting sentence structures containing one or more missing words.

14. The method of claim 1, wherein each of the two or more locations that have the potential error would be logically correct without inserting the missing word and when inserting the missing word.

15. A text correction system comprising:
  a server communicatively coupled to a plurality of communication devices, wherein the server includes:
    a processor, wherein the processor is configured to perform a method, the method comprising:
    receiving a first communication sent from a first communication device by a first user;
    forwarding the first communication to one or more other communication devices associated with one or more other users;
    receiving a second communication sent from the first communication device by the first user, wherein the second communication includes an edit command character to correct an error in the first communication, wherein the error is a missing word located between two adjacent sequential words in the first communication;
    determining, based on the edit command character, two or more locations that have a potential error in the first communication, wherein each of the two or more locations that have the potential error would be grammatically correct without inserting the missing word and when inserting the missing word;
    prompting the first user to select at least one of the two or more locations that have the potential error to correct;
    correcting, in response to the first user selecting the at least one location to correct, the error by inserting the missing word between the two adjacent sequential words at the selected at least one location in the first communication; and
    forwarding a corrected version of the first communication to the one or more other communication devices.

16. The text correction system of claim 15, wherein the method performed by the processor further comprises:
  determining the first communication containing the error has not been read by the one or more other users; and
  replacing the first communication containing the error with the corrected version of the first communication.

17. The text correction system of claim 15, wherein the method performed by the processor further comprises:
  determining the first communication containing the error has been read by the one or more other users; and
  highlighting a correction in the corrected version of the first communication prior to forwarding the corrected version of the first communication to the one or more other users.

18. The text correction system of claim 15, wherein the edit command character is configured to add one or more words to the first communication.

19. The text correction system of claim 18, wherein the edit command character is a plus character placed adjacent to the one or more words.

20. A computer program product comprising a computer-readable storage medium having program instructions embodied therewith, the program instructions executable by a processor to cause the processor to perform a method comprising:
  receiving a first communication sent from a first communication device by a first user;
  forwarding the first communication to one or more other communication devices associated with one or more other users;
  receiving a second communication sent from the first communication device by the first user, wherein the second communication includes an edit command character to correct an error in the first communication, wherein the error is a missing word located between two adjacent sequential words in the first communication;
  determining, based on the edit command character, two or more locations that have a potential error in the first communication, wherein each of the two or more locations that have the potential error would be grammatically correct without inserting the missing word and when inserting the missing word;
  prompting the first user to select at least one of the two or more locations that have the potential error to correct;
  correcting, in response to the first user selecting the at least one location to correct, the error by inserting the missing word between the two adjacent sequential words at the selected at least one location in the first communication; and
  forwarding a corrected version of the first communication to the one or more other communication devices.

* * * * *